United States Patent [19]

Edelstein et al.

[11] Patent Number: 4,754,138
[45] Date of Patent: Jun. 28, 1988

[54] SCINTILLATION APPARATUS AND METHOD WITH SURFACE-MODIFIED POLYETHYLENE SAMPLE VESSELS

[76] Inventors: Harold Edelstein, 38-59 D'Auria Dr., Fair Lawn, N.J. 07410; Daniel M. Koetters, 12 George Street, Butler, N.J. 07405

[21] Appl. No.: 745,098

[22] Filed: Jun. 17, 1985

[51] Int. Cl.⁴ .......................... G01T 1/00; B65D 85/84
[52] U.S. Cl. ..................................... 250/328; 250/364; 206/524.3; 252/301.17
[58] Field of Search ............... 206/524.1, 524.3, 524.4, 206/524.5, 524.6; 424/1.1; 250/328, 364; 252/301.17; 264/83, 85

[56] References Cited

U.S. PATENT DOCUMENTS

| | | | |
|---|---|---|---|
| 2,811,468 | 10/1957 | Joffre | 264/83 X |
| 3,646,346 | 2/1972 | Catt | 206/524.3 X |
| 3,862,284 | 1/1975 | Dixon et al. | 264/83 |
| 4,021,670 | 5/1977 | Noakes | 215/228 X |
| 4,142,032 | 2/1979 | D'Angelo | 525/356 |
| 4,438,017 | 3/1984 | Mallik et al. | 252/301.17 |
| 4,443,356 | 4/1984 | Mallik et al. | 252/301.17 |
| 4,444,677 | 4/1984 | Edelstein et al. | 252/301.17 |
| 4,467,075 | 8/1984 | Tarancon | 525/356 |

*Primary Examiner*—John F. Terapane
*Assistant Examiner*—John S. Maples

[57] ABSTRACT

Liquid scintillation vials are disclosed formed from polyethylene or polypropylene and fluorinated on at least the inner surface. The advantageous physical properties and disposability of polyethylene or polypropylene are retained, while reducing permeation of organic solvents of the scintillation cocktail into or through the walls. Therefore problems of vial swelling, resulting in jamming of scintillation counters, are avoided.

14 Claims, No Drawings

SCINTILLATION APPARATUS AND METHOD WITH SURFACE-MODIFIED POLYETHYLENE SAMPLE VESSELS

BACKGROUND OF THE INVENTION

The present invention relates to scintillation counting, and especially to sample vessels (usually vials) for such counting.

Automated instruments are well-known for measuring the radionucleide content of samples (frequently biological samples) placed in each of a series of vials and mixed therein with a scintillation cocktail. Since the scintillants which emit visible (countable) light in response to radioactive decay are organic-soluble and the samples are generally aqueous, the cocktail typically contains the scintillant, at least one organic solvent and at least one surfactant.

Representative scintillation cocktails are described in U.S. Pat. Nos. 4,443,356 (1984), 4,444,677 (1984), 4,438,017 (1984).

Vials for such counters are traditionally glass, and must be carefully washed between uses to avoid various types of cross-contamination. While disposable polyethylene vials have been suggested and used, they have three major drawbacks compared to glass: (1) permeation of organic solvents leading to objectionable or even potentially toxic vapors in parts of the laboratory generally not equipped with proper airflow or hoods for such vapors, (2) swelling or deformation of the vials so as to jam or stick when being automatically inserted into or removed from the counting well, and (3) adherence of biological matter to the inner surface of the vials so as to either interfere with emitted light or to overcome the intimate mixing of organic and aqueous phases required for efficient energy transfer (scintillation efficiency).

Various materials other than glass or polyethylene having been suggested for such vials. In U.S. Pat. No. 4,021,670 to Noakes (1977), various plastic such as "nylon, linear polyethylene and the fluoroplastics (Teflons)" are mentioned. Polytetrafluoroethylene (sold by Dupont under the registered trademark "TEFLON") is difficult to shape (is not melt processable) and is expensive, such that disposable PTFE vials would not be practicable. Nylons (polyamides) would probably swell worse than polyethylene, suffering from both the aqueous and the organic contents. See also Chem. Abstr. 93: 103429W.

BRIEF DESCRIPTION OF THE INVENTION

The present invention is based upon the surface fluorination of polyethylene or polypropylene scintillation vials, which overcome the problems of polyethlene vials without forfeiting their advantageous features of disposability, low cost, precise moldability and resistance to the aqueous contents. In particular, organic components of scintillation cocktails neither swell nor permeate through fluorinated polyethylene to a deleterious degree, while the problem of adherence of biological materials is also significantly reduced. Accordingly, the present invention provides an improved liquid scintillation counting apparatus having a sample vessel of the type adapted to be placed in a counter sample well opposite the face of a photosensing device and containing a scintillation mixture containing a volatile organic solvent and a biological sample, characterized by the sample vessel being polyethylene or polypropylene and at least the inner surface of the polyethylene or polypropylene being fluorinated.

The present invention also provides an improved method of determining the radionucleide content of an aqueous sample wherein the sample and an organic scintillation cocktail are mixed in a sample vessel, the filled sample vessel is placed in a counter sample well and the light bursts emitted from the filled sample vessel in the sample well are counted, characterized by the sample vessel being polyethylene or polypropylene and at least the inner surface of the polyethylene or polypropylene being fluorinated.

DETAILED DESCRIPTION OF THE INVENTION

The shape and size of vials or other sample vessels used in the present invention are those known to the art of scintillation counting. For ease of introduction and removal from a sample well, cylindrical vials are preferred, with outside diameters in the range of 5–50 mm and heights in the range of 5–100 mm. Typical sizes are standard vials of 27.2 mm outside diameter and 59.7 mm height and mini-vials of 17.0 mm outside diameter and 54.4 mm height.

While polyethylene or polypropylene may be used in the present invention, polyethylene is preferred, and is referred to (without limiting the invention) in the following description. The polyethylene used for the vials may be of various density, molecular weight and melting temperature. Preferred are the injection molding grades of high density (specific gravity at least 0.95 g/cm$^3$) polyethylene. Such polyethylene may be either a homopolymer or one of the various copolymers (typically with 1–15% of a higher alkene comonomer) sold as polyethylene.

If it is desired to fluorinate both the interior surface and exterior surface, then it is preferred to perform fluorination on the already-formed vials. Various treatments with elemental fluorine alone or with fluorine in combination with inert gases or other elemental halogenes (e.g., biomine) may be used. Exemplary treatments to fluorinate the surface of polyethylene are described in U.S. Pat. Nos. 3,862,284 (Air Products 1975), 4,142,032 (Union Carbide 1979) and 4,467,075 (Union Carbide 1984).

The exact level of fluorination is not critical, and can best be determined empirically using tests for swelling, for solvent permeation and for retention of scintillation efficiency as shown in the present Examples. Once suitable conditions (especially of time and temperature) are established for a particular combination of fluorine-containing gas, fluorination apparatus and vial size, reproducibility should be good. In general, it is believed that a low level of surface fluorination is adequate for the present invention and that further treatment normally results in increasing the depth of polyethylene which is fluorinated. Thus, once a minimum level of treatment is obtained, further treatment for some finite period will not be disadvantageous so long as the majority of the mass of polyethylene remains unfluorinated.

If it is desired to fluorinate only the interior surface of the vials, then it is preferred to use an elemental fluorine-containing gas at the end of a blow-molding or other molding operation while the exterior of the vial is still in contact with the mold.

In use, the vial is filled with a scintillation cocktail and a sample which contains some or no amounts of a radionucleide. The cocktail normally contains an organic solvent in which a fluor is dissolved) and one or more surfactants for suspending the organic phase finely in an aqueous phase (which is either provided in the cocktail or provided by the sample). Such cocktails and methods for their use are described generally in D. L. Horrocks, *Applications of Liquid Scintillation Counting* (Academic Press 1974); *Liquid Scintillation Counting, Recent Applications And Developments*, vols. 1 and 2 (Academic Press, C-T. Peng, et al, eds, 1980); Y. Kobayashi, *LSC Application Notes* 1–30 (1978) and 31–50 (1980) (New England Nuclear Corporation); and in the literature provided with various commerical cocktails.

The vials of the present invention find particular application with scintillation cocktails containing alkylbenzene organic solvents such as toluene, xylene, cumene, pseudocumene (methyl, ethylbenzene), and paraxylene. Other suitable organic solvents include dioxane. The fluorination inhibits loss of the solvent into or through the vial wall. The vials of the present invention also find particular utility with the fluors PPO and POPOP or other oxazine-type fluors. The fluorination inhibits loss of scintillation efficiency which may proceed via: (1) adherence of fluors or sample material to the vial wall, (2) loss of solvent from the suspension into or through the vial wall or (3).

Because of the long stability of filled vials in accordance with the present invention, both against solvent loss and against swelling, it becomes possible to make up filled vials and read them in a scintillation counter either immediately or after a delay period. This has special value if samples are collected in a variety of sites and analyzed on a central counter, or if the counter is used by laboratory groups with uneven workloads of vials to be counted. Furthermore, even after counting, the vials may be retained in their filled state and recounted later, especially as a quality control procedure.

EXAMPLES

For the following experiments, two sizes of polyethylene vials were used. The larger vials had a 22 ml interior volume and were shaped as cylinders with a 27 mm outside diameter and 59 mm height. The polyethylene, which had been injection molded, was approximately 2.5 mm in average thickness. The smaller vials had a 7 ml interior volume and were shaped as cylinders with a 17 mm outside diameter, a 54 mm height and a 1.5 mm average thickness.

Large numbers of each vial size was fluorinated in fluoropolymer racks for varying lengths of time in accordance with the Linde SMP process (Union Carbide Corporation, see U.S. Pat. No. 4,467,075). In the following Examples, Level I refers to the least degree of fluorination, Level II to the intermediate level of fluorination and Level III to the greatest degree of fluorination. Unfluorinated vials were used as controls. The polyethylene screw caps were fluorinated separately on the same trays, such that the interior and exterior surfaces of both vials and caps were fluorinated.

EXAMPLE 1

Sixteen of the larger vials (four each of Level I, Level II, Level III and Controls) were filled with a xylene-based scintillation cocktail (ScintiVerse I from Fisher Scientific) and stored at 25° C. for 72 days. Outside diameters of the vials were measured initially and after 21 and 72 days. The increase in outside diameter (expressed as a percentage change, was, on average for each group:

|      | Control | Level I | Level II | Level III |
|------|---------|---------|----------|-----------|
| 21 d | 1.2%    | 0.05%   | 0.05%    | 0.05%     |
| 72 d | 1.3%    | 0.05%   | 0.3%     | 0.4%      |

EXAMPLE II

Example I was repeated using a pseudocumene-based scintillation cocktail (ScintiVerse II from Fisher Scientific; see U.S. Pat. No. 4,444,677). The percentage changes in outside diameter were:

|      | CONTROL | LEVEL I | LEVEL II | LEVEL III |
|------|---------|---------|----------|-----------|
| 21 d | 1.5%    | 0.17%   | 0.17%    | 0.17%     |
| 72 d | 1.7%    | 0.3%    | 0.3%     | 0.3%      |

EXAMPLE 3

Example 1 was repeated using the smaller vials and the xylene-based scintillation cocktail. The resulting increases in outside diameter were:

|      | CONTROL | LEVELS I, II, III |
|------|---------|-------------------|
| 21 d | 1.0%    | 0.05%             |
| 72 d | 0.95%   | 0.05%             |

EXAMPLE 4

Example 1 was repeated using the smaller vials and the pseudocumene-based scintillation cocktail (ScintiVerse II cocktail). The resulting increases in outside diameter were:

|      | CONTROL | LEVEL I, II, III |
|------|---------|------------------|
| 21 d | 1.2%    | 0.05%            |
| 72 d | 1.5%    | 0.05%            |

EXAMPLE 5—Counting Efficiency

Sixteen of the smaller vials filled with the xylene-based scintillation cocktail (as in Example 3) were also charged with 100 microliters of a radioactive sample, the sample having 22,000 disintegrations per minute (dpm). The samples were added immediately before counting. The vials were then read on a Beckman Model LS-1800 Scintillation Counter initially and after 21 and 72 days. For each vial, the loss of cpm registered was noted and converted into a percentage loss of counting efficiency. The average results for the four replication were:

|         | CONTROL | LEVEL I | LEVEL II | LEVEL III |
|---------|---------|---------|----------|-----------|
| 21 days | −6%     | −3%     | −4%      | −3%       |
| 72 days | −24%    | −7%     | −9%      | −7%       |

EXAMPLE 6—Counting Efficiency

Example 5 was repeated using the small vials and the pseudocumene-based scintillation cocktail of Example 4. The average losses in counting efficiency were:

|        | CONTROL | LEVEL I | LEVEL II | LEVEL III |
|--------|---------|---------|----------|-----------|
| 21 days | −11%   | −2%     | −2%      | −2%       |
| 72 days | −31%   | −9%     | −9%      | −7%       |

EXAMPLE 7

One of the 20 ml vials was filled with xylene and placed individually in a four liter glass chamber at 25° C. After 45 minutes, air samples were taken of the chamber around the vial and analyzed for ppm xylene (microliters xylene/liter air). Readings were 51 ppm for control vials, 18 ppm for Level I vials, 13.5 ppm for Level II vials and 13 ppm for Level III vials.

EXAMPLE 8

Example 7 was repeated except that the vials were filled with pseudocumene. The measured pseudocumene levels were 38 ppm for the control vials, 8 ppm for the Level I and Level II vials and 7 ppm for the Level III vials.

We claim:

1. A method of determing the radionuclide content of an aqueous sample wherein the sample and an organic scintillation cocktail are mixed in a sample vessel, the filled sample vessel is placed in a counter sample well and the light bursts emitted from the filled sample vessel in the sample well are counted, characterized by the sample vessel being polyethylene or polypropylene and at least the inner surface of the polyethylene or polypropylene sample vessel being fluorinated.

2. The method of claim 1 wherein the volatile organic solvent is selected from the group consisting of toluene, xylene, pseudocumene and mixtures thereof.

3. The method of claim 1 wherein the sample vessel is polyethylene.

4. The method of claim 3 wherein the inner surface only of the polyethylene sample vessel is fluorinated.

5. The method of claim 4 wherein the volatile organic solvent is aromatic.

6. The method of claim 5 wherein the volatile organic solvent is an alkylbenzene.

7. A liquid scintillation counting apparatus having a sample vessel of the type adapted to be placed in a counter sample well opposite the face of a photosensing device and containing a scintillation mixture containing a volatile organic solvent and a biological sample, characterized by the sample vessel being polyethylene or polypropylene and at least the inner surface of the polyethylene or polypropylene sample vessel being fluorinated.

8. The apparatus of claim 7 wherein the sample vessel is polyethylene.

9. The apparatus of claim 8 wherein the inner surface only of the sample vessel is fluorinated.

10. The apparatus of claim 8 wherein the inner and outer surfaces of the sample vessel are fluorinated.

11. The apparatus of claim 8 wherein the volatile organic solvent is aromatic.

12. The apparatus of claim 11 wherein the volatile organic solvent is an alkylbenzene.

13. The apparatus of claim 12 wherein the volatile organic solvent is selected from the group consisting of toluene, xylene, pseudocumene and mixtures thereof.

14. The apparatus of claim 13 wherein the filled sample vessel is kept full of sample and scintillation cocktail after being counted and is reintroduced into the counter sample well and recounted.

* * * * *